United States Patent
Yanagi et al.

(10) Patent No.: US 10,612,660 B2
(45) Date of Patent: Apr. 7, 2020

(54) GASKET

(71) Applicant: NOK CORPORATION, Tokyo (JP)

(72) Inventors: Tokunori Yanagi, Shizuoka (JP);
Masasuke Uchiyama, Shizuoka (JP);
Takuya Amano, Shizuoka (JP); Yuki Nakagawa, Shizuoka (JP); Naoki Hagiwara, Shizuoka (JP)

(73) Assignee: NOK CORPORATION, Tokyo (JP)

( * ) Notice: Subject to any disclaimer, the term of this patent is extended or adjusted under 35 U.S.C. 154(b) by 29 days.

(21) Appl. No.: 16/074,956

(22) PCT Filed: Feb. 2, 2017

(86) PCT No.: PCT/JP2017/003685
§ 371 (c)(1),
(2) Date: Aug. 2, 2018

(87) PCT Pub. No.: WO2017/135337
PCT Pub. Date: Aug. 10, 2017

(65) Prior Publication Data
US 2019/0032783 A1   Jan. 31, 2019

(30) Foreign Application Priority Data

Feb. 3, 2016  (JP) .................. 2016-018756

(51) Int. Cl.
*F16J 15/3236* (2016.01)
*F16J 15/12* (2006.01)
*F16J 15/10* (2006.01)

(52) U.S. Cl.
CPC .......... *F16J 15/121* (2013.01); *F16J 15/104* (2013.01); *F16J 15/12* (2013.01); *F16J 15/122* (2013.01);

(Continued)

(58) Field of Classification Search
CPC .......... F16J 15/121; F16J 15/104; F16J 15/12; F16J 15/122; F16J 15/125; F16J 15/127; F16J 15/3236
See application file for complete search history.

(56) References Cited

U.S. PATENT DOCUMENTS 2,797,944 A * 7/1957 Riesing ................ F16J 15/3248
277/573
2,830,858 A * 4/1958 Moorman ........... F16C 33/7853
384/484

(Continued)

FOREIGN PATENT DOCUMENTS

CN   1688833 A   10/2005
CN   102410368 A   4/2012

(Continued)

OTHER PUBLICATIONS

International Search Report in counterpart Application No. PCT/JP2017/003685, dated May 9, 2017.

(Continued)

*Primary Examiner* — Gilbert Y Lee
(74) *Attorney, Agent, or Firm* — Greenblum & Bernstein, P.L.C.

(57) ABSTRACT

The invention provides a gasket having sealing lips in axial both ends of a gasket body in which a reinforcing ring is embedded. The gasket, has a structure in which the gasket body is displaced to the one axial side within the mounting groove when pressure acts on the gasket because the rigidity of a second sealing lip is set to be higher than the rigidity of a first sealing lip or a reinforcing ring is disposed closer to the one axial side within the gasket body. Furthermore, a seal bead which is brought into close contact to the bottom surface of the mounting groove when mounted is provided in the gasket body and a space portion surrounded by the (Continued)

second sealing lip, the seal bead, and the bottom surface and the other side surface of the mounting groove when mounted is provided.

4 Claims, 5 Drawing Sheets

(52) U.S. Cl.
CPC ......... *F16J 15/125* (2013.01); *F16J 15/3236* (2013.01)

(56) References Cited

U.S. PATENT DOCUMENTS

| | | | | |
|---|---|---|---|---|
| 3,635,480 A | * | 1/1972 | Bain | F16J 15/123 |
| | | | | 277/651 |
| 4,055,352 A | | 10/1977 | Allinquant et al. | |
| 4,258,927 A | * | 3/1981 | Cather, Jr. | F16J 15/3268 |
| | | | | 277/309 |
| 4,712,802 A | * | 12/1987 | Hewison | F16B 43/001 |
| | | | | 411/542 |
| 5,201,625 A | * | 4/1993 | Takenouchi | H01R 13/6215 |
| | | | | 411/369 |
| 5,409,337 A | * | 4/1995 | Muyskens | F16J 15/062 |
| | | | | 411/148 |
| 7,854,434 B2 | * | 12/2010 | Heiman | F16J 15/121 |
| | | | | 277/628 |
| 2006/0103075 A1 | | 5/2006 | Zahn | |
| 2008/0231002 A1 | * | 9/2008 | Wagner | F16J 15/121 |
| | | | | 277/634 |
| 2008/0252020 A1 | * | 10/2008 | Heiman | F16J 15/121 |
| | | | | 277/593 |
| 2017/0089465 A1 | | 3/2017 | Yanagi | |

FOREIGN PATENT DOCUMENTS

| | | |
|---|---|---|
| CN | 204253630 U | 4/2015 |
| JP | H01-261564 | 10/1989 |
| JP | H06-32834 | 4/1994 |
| JP | 2012-67790 | 4/2012 |
| WO | WO2015/137491 | 9/2015 |

OTHER PUBLICATIONS

European Extended Search Report in counterpart Application No. EP17747489.7, dated Jan. 18, 2019.
Chinese Office Action, Chinese Patent Office, Patent Application No. 201780005731.7, dated Jun. 27, 2019.

* cited by examiner

GASKET

BACKGROUND OF THE INVENTION

Field of the Invention

The present invention relates to a gasket which is a kind of a sealing device relating to a sealing technique. The gasket of the present invention is used in the automobile related field or used in the fields of general industrial machinery and the like, for example.

Description of the Conventional Art

As illustrated in FIG. 4, a gasket 11 which has been used for a hydraulic channel to receive pressure of the hydraulic channel and seals the pressure (pressure fluid) has been generally structured so that sealing lips 15 and 16 are provided in the axial both ends of a gasket body 12 in which a reinforcing ring 14 is embedded and that, when the gasket 11 is mounted to a mounting groove 23, and then compressed in the axial direction, both the sealing lips 15 and 16 each fall down inside (radially inward, rightward in the figure) (structured to self-seal in response to pressure). Both the sealing lips 15 and 16 each receive pressure, and then apply the reaction force in the axial direction to the gasket body 12. However, when the pressure is high, a behavior is exhibited that the axial set position of the gasket body 12 shifts to either side in the axial direction due to a minute rigidity difference between both the sealing lips 15 and 16 in some cases. In that case, the sealing lip of the side in which the interference is to be lost has posed a problem that the oil blows under the pressure or the rubber deformation area increases with an increase in a gap, so that the rubber distortion increases, which results in fatigue cracks of the rubber.

PRIOR ART DOCUMENT

Patent Documents

Patent Document 1: Japanese Unexamined Utility Model Publication No. 6-32834
Patent Document 2: Japanese Unexamined Patent Publication No. 1-261564
Patent Document 3: Japanese Unexamined Patent Publication No. 2012-67790

SUMMARY OF THE INVENTION

Problem to be Solved by the Invention

In order to solve the above-described problems, the applicant of this application has previously proposed a gasket relating to the prior art illustrated in FIG. 5 (see Patent Document 3).

More specifically, the gasket 11 according to the prior art illustrated in this FIG. 5 is mounted to a gasket mounting groove 23 provided inside a housing 21 having a pressure channel to seal a pressure (pressure fluid) P, has a gasket body 12 in which a reinforcing ring 14 is embedded, a first sealing lip 15 which is provided in an end portion of one axial side (upward in the figure) of the gasket body 12 and is brought into close contact to one side surface 23a of the mounting groove 23 when mounted, and a second sealing lip 16 which is provided in an end portion of the other axial side (downward in the figure) of the gasket body 12 and is brought into close contact to the other side surface 23b of the mounting groove 23 when mounted, and has a structure in which the gasket body 12 is displaced to the one axial side within the mounting groove 23 when pressure acts on the gasket 11 because the rigidity of the second sealing lip 16 is set to be higher than the rigidity of the first sealing lip 15 or the reinforcing ring 14 is disposed closer to the one axial side within the gasket body 12, and in the gasket 11, a third sealing lip 20 is provided along with the second sealing lip 16 in order to compensate a sealability reduction due to an interference reduction of the second sealing lip 16 accompanying the displacement to the one axial side of the gasket body 12.

The gasket 11 of the above-described configuration has the structure in which the gasket body 12 is displaced to the one axial side within the mounting groove 23 when pressure acts on the gasket 11 because the rigidity of the second sealing lip 16 is set to be higher than the rigidity of the first sealing lip 15 or the reinforcing ring 14 is disposed closer to the one axial side within the gasket body 12. Therefore, the direction where the gasket body 12 is displaced when receiving pressure from the inner peripheral side is specified to the one axial side beforehand and, moreover, the third sealing lip 20 is provided along with the second sealing lip 16 in order to compensate a sealability reduction due to an interference reduction of the second sealing lip 16 accompanying the displacement to the one axial side of the gasket body 12. Therefore, the sealability of the side (the other axial side) in which the interference decreases can be compensated by the third sealing lip 20.

It is an object of the present invention to further improve the performance of the gasket according to the prior art of FIG. 5 described above and more specifically to provide a gasket having sealing lips in the axial both ends of a gasket body in which a reinforcing ring is embedded. In the gasket, the sealability of a side in which the interference decreases can be maintained even when the gasket body is displaced to the one axial side within the mounting groove when pressure acts and, moreover, even when the dimensional tolerance relating to the groove width of the mounting groove is large, the sealability can be maintained.

In order to achieve the object, a gasket of the present invention is mounted to a gasket mounting groove which is opened radially inward or radially outward and has a bottom surface and a pair of axial side surfaces to seal pressure, has a gasket body in which a reinforcing ring is embedded, a first sealing lip which is provided in an end portion of one axial side of the gasket body and is brought into close contact to one side surface of the mounting groove when mounted, and a second sealing lip which is provided in an end portion of the other axial side of the gasket body and is brought into close contact to the other side surface of the mounting groove when mounted, and has a structure in which the gasket body is displaced to the one axial side within the mounting groove when pressure acts on the gasket because the rigidity of the second sealing lip is set to be higher than the rigidity of the first sealing lip or the reinforcing ring is disposed closer to the one axial side within the gasket body, and in the gasket, a seal bead which is brought into close contact to the bottom surface of the mounting groove when mounted is provided in the gasket body and a space portion surrounded by the second sealing lip, the seal bead, and the bottom surface and the other side surface of the mounting groove when mounted is provided.

The gasket of the present invention having the above-described configuration has the structure in which the gasket body is displaced to the one axial side within the mounting groove when pressure acts on the gasket because the rigidity of the second sealing lip is set to be higher than the rigidity of the first sealing lip or the reinforcing ring is disposed closer to the one axial side within the gasket body. Therefore, the direction where the gasket body is displaced when receiving pressure from the opening side (for example, the inner peripheral side) of the mounting groove is specified to the one axial side beforehand and, moreover, the seal bead which is brought into close contact to the bottom surface of the mounting groove when mounted is provided in the gasket body. Therefore, a sealability reduction due to an interference reduction of the second sealing lip accompanying the displacement to the one axial side of the gasket body can be compensated by the seal bead.

In addition thereto, since the space portion surrounded by the second sealing lip, the seal bead, and the bottom surface and the other side surface of the mounting groove when mounted is provided, the second sealing lip can be elastically deformed in a direction of narrowing the capacity of the space portion. Therefore, due to the fact that the second sealing lip is elastically deformed in the direction of narrowing the capacity of the space portion when pressure acts on the second sealing lip from the opening side (for example, the inner peripheral side) of the mounting groove, the lip inclination angle of the second sealing lip to the gasket central axis line decreases and the lip axial length increases corresponding to the decrease. Therefore, the second sealing lip presses and moves the gasket body to the one axial side, and further presses and moves the first sealing lip on the axial opposite side to the one axial side through the gasket body by the reaction force generated at this time. Therefore, even when the dimensional tolerance of the groove width of the mounting groove is large and the groove width is large, the first sealing lip continues to contact the one side surface of the mounting groove, and thus the sealability by the first sealing lip can be maintained.

A rising surface (for example, outer peripheral surface) on the side of the bottom surface of the mounting groove of the second sealing lip and a rising surface of the other axial side of the seal bead may be continuously formed by a tapered surface of a linear cross sectional shape. Thus, a space portion having a substantially triangular cross section is provided on the side of the bottom surface of the mounting groove of the second sealing lip.

Moreover, the reinforcing ring may be embedded in the gasket body in a state where an end surface of the one axial side thereof is exposed to an end surface of the one axial side of the gasket body. Thus, when pressure acts on the gasket, so that the gasket body is displaced to the one axial side within the mounting groove when mounted, the end surface of the one axial side of the reinforcing ring directly contacts a housing. Therefore, the reinforcing ring serves as an outer wall to suppress the deformation of the first sealing lip, and therefore the pressure resistance of the first sealing lip can be increased.

Effect of the Invention

According to the present invention, in the gasket having the sealing lips in the axial both ends of the gasket body in which the reinforcing ring is embedded, the sealability of the side in which the interference decreases can be maintained even when the gasket body is displaced to the one axial side within the mounting groove when pressure acts and, moreover, even when the dimensional tolerance of the groove width of the mounting groove is large and the groove width is large, the sealability can be maintained as described above.

DETAILED DESCRIPTION OF PREFERRED EMBODIMENTS

The present invention contains the following embodiments.

(1) In order to reduce the reaction force of a gasket and secure the interference followability thereof, the gasket is configured to be a lip type. The volume (rigidity) of a lip portion is set to be larger in a second lip than in a first lip. The second lip is configured so that the radial deformation is hardly affected by the core metal rigidity by securing a large distance from a core metal. As a behavior in pressurization, the second lip is pressed against a mounting groove corner portion, so that the surface pressure increases and, moreover, the first lip side is raised by the rubber volume of the second lip pressed against the corner portion, so that the interference of the first lip increases, whereby self-sealing functions, which enables sealing on a small cross section as compared with a conventional lip type.

(2) Moreover, the position of the gasket in pressurization can be stably brought to the first lip side, and therefore, when a mating component (housing) of the first lip side is a resin material, an interference reduction due to resin creeping can be followed.

(3) Moreover, due to the fact that the second lip is pressed against the outer peripheral side in pressurization, the axial length as the entire gasket is enlarged, and therefore, even when the mating component (housing) of the second lip side is a resin material, an interference reduction due to resin creeping can be followed. Therefore, even when the mating components (housing) of both the first lip side and the second lip side are resin materials and the groove width is gradually increased due to resin creeping, an interference reduction can be followed.

(4) By reducing the rubber thickness of the root of the first lip, the deformation to the outer diameter side of the first lip can be suppressed also in a high pressure environment, and thus the breakage of the first lip and seal leakage can be suppressed. By eliminating the rubber circumference on the upper surface of a metal fitting to expose the metal fitting and also forming an inner diameter corner portion of the metal fitting into a chamfered shape from the R-shape, the metal fitting serves as the outer wall to contribute to an improvement of the pressure resistance.

(5) Moreover, the bent shape of the lower end of the metal fitting is eliminated, and then changed to a chambered shape, whereby further space saving in the radial direction can be achieved.

(6) The gasket of the present invention is applicable not only to inner peripheral sealing but to outer peripheral sealing when the inner and outer peripheries are reversed.

EMBODIMENTS

Next, embodiments of the present invention are described according to the drawings.

Figure 1:
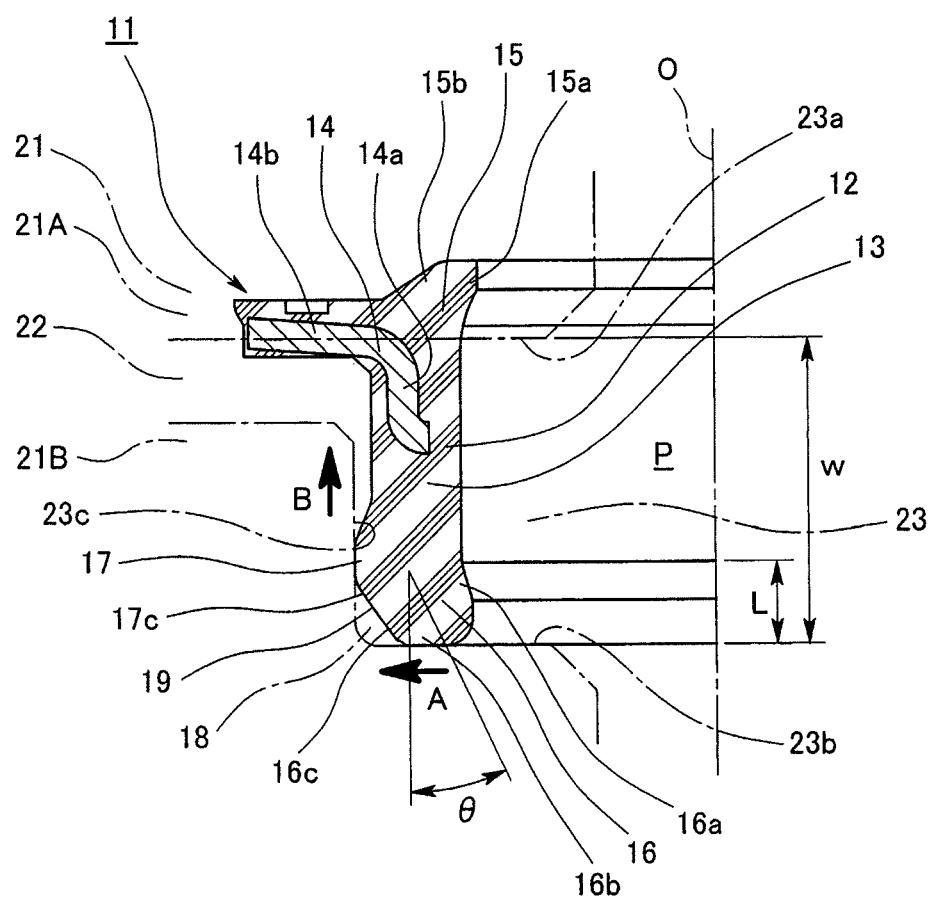
FIG. 1 is a half cross sectional view of a gasket according to an embodiment of the present invention.

FIG. 1 illustrates the half cross section of a gasket 11 according to an embodiment of the present invention. The gasket 11 according to this embodiment is mounted to a gasket mounting groove 23 provided inside a housing 21 having a pressure (hydraulic) channel to seal a pressure (pressure fluid) P, such as a joint seal in an automatic transmission (AT) in vehicles, such as an automobile, and is configured as follows.

More specifically, a gasket body 12 in the gasket 11 is provided by embedding a reinforcing ring 14 containing a steel material, such as metal, inside an annular body (rubber annular body) 13 containing a predetermined rubber-like elastic body. A first sealing lip 15 which is brought into close contact to one side surface 23a of the mounting groove 23 when mounted is integrally molded in an end portion of one axial side (upward in the figure) of the gasket body 12 and a second sealing lip 16 which is brought into close contact to the other side surface 23b of the mounting groove 23 when mounted is integrally molded in an end portion of the other axial side (downward in the figure) of the gasket body 12.

The mounting groove 23 is an annular groove having a rectangular cross section, is opened radially inward, and has a pair of planar side surfaces 23a and 23b orthogonal to a central-axis line O of the gasket 11 and a cylindrical bottom surface 23c parallel to the central-axis line O. A housing 21 contains a combination a plurality of housing members 21A and 21B arranged side by side in the axial direction. The mounting groove 23 is provided in a split manner in an inner peripheral portion in a facing portion 22 of the plurality of housing members 21A and 21B. Therefore, the one side surface 23a of the mounting groove 23 is formed by the one housing member 21A, and the other side surface 23b and the bottom surface 23c of the mounting groove 23 are formed by the other housing member 21B. When a gap is present in the facing portion 22 of the plurality of housing members 21A and 21B, the pressure P of a pressure channel inside the housing 21 leaks from the gap. Therefore, the gasket 11 is mounted in order to seal the leakage.

The first and second sealing lips 15 and 16 are configured so as to fall down radially inward by the interference when brought into close contact to the side surfaces 23a and 23b, respectively, of the mounting groove 23 when mounted.

Therefore, the first sealing lip 15 is formed so as to be projected radially obliquely inward from the gasket body 12 as a whole, and thus integrally has an inner diameter projection portion 15a projected radially inward relative to the inner diameter surface of the gasket body 12 and an end surface projection portion 15b projected to the one axial side relative to one end surface of the gasket body 12.

On the other hand, the second sealing lip 16 is also formed so as to be projected radially obliquely inward from the gasket body 12 as a whole, and thus has an inner diameter projection portion 16a projected radially inward relative to the inner diameter surface of the gasket body 12 and an end surface projection portion 16b projected to the other axial side relative to the other end surface of the gasket body 12.

The first and second sealing lips 15 and 16 are formed to have cross-sectional shapes asymmetric to the axial direction (vertical direction in the figure) and are formed in such a manner that the second sealing lip 16 has rigidity (large rubber volume) higher than that of the first sealing lip 15 and is more difficult to be deformed in the axial direction than the first sealing lip 15. Moreover, the reinforcing ring 14 is disposed closer to the one axial side within the gasket body 12 as illustrated in the figure. Therefore, when high pressure acts from the inside in the radial direction to the gasket 11, the gasket body 12 is likely to be displaced to the one axial side within the mounting groove 23. When the gasket body 12 is displaced to the one axial side within the mounting groove 23 as described above, the interference of the second sealing lip 16 to the other side surface 23b of the mounting groove 23 decreases, and thus the sealability by the second sealing lip 16 decreases in some cases.

Then, in order to prevent the decrease, the gasket 11 is configured so that an annular seal bead 17 which is brought into close contact to the bottom surface 23c of the mounting groove 23 when mounted is provided near the position of the end portion of the other axial side, which is the outer peripheral surface of the gasket body 12, and, due to the fact that the seal bead 17 is brought into close contact to the bottom surface 23c of the mounting groove 23, the sealability reduction and the insufficiency of the sealability by the second sealing lip 16 are compensated.

Moreover, the second sealing lip 16 is provided in the end portion of the other axial side of the gasket body 12 and the seal bead 17 is provided near the position of the end portion of the other axial side, which is the outer peripheral surface of the gasket body 12. Therefore, when the gasket 11 is mounted to the mounting groove 23, an annular space portion 18 surrounded by the second sealing lip 16, the seal bead 17, and the bottom surface 23c and the other side surface 23b of the mounting groove 23 is provided on the outer peripheral side of the second sealing lip 16.

An outer peripheral surface 16c of the second sealing lip 16 and a rising surface 17c of the other axial side of the seal bead 17 are continuously formed by a tapered surface 19 of a linear cross sectional shape.

The gasket 11 having the above-described configuration has a structure in which the gasket body 12 is displaced to the one axial side within the mounting groove 23 when pressure acts on the gasket 11 because the rigidity of the second sealing lip 16 is set to be higher than the rigidity of the first sealing lip 15 and the reinforcing ring 14 is disposed closer to the one axial side within the gasket body 12. Therefore, the direction where the gasket body 12 is displaced when receiving pressure from the inner peripheral side is specified to the one axial side beforehand. Moreover, the seal bead 17 which is brought into close contact to the bottom surface 23c of the mounting groove 23 when mounted is provided on the outer peripheral surface of the gasket body 12. Therefore, the sealability reduction due to the interference reduction of the second sealing lip 16 accompanying the displacement to the one axial side of the gasket body 12 can be compensated by sealing by the seal bead 17.

Moreover, the space portion 18 surrounded by the second sealing lip 16, the seal bead 17, and the bottom surface 23c and the other side surface 23b of the mounting groove 23 when mounted is provided on the outer peripheral side of the second sealing lip 16, and therefore the second sealing lip 16 can be elastically deformed in a direction of narrowing the capacity of the space portion 18. Therefore, due to the fact that the second sealing lip 16 is elastically deformed in the direction of narrowing the capacity of the space portion 18 (arrow A) when pressure acts on the second sealing lip 16 from the inner peripheral side, the lip inclination angle θ of the second sealing lip 16 to the gasket central-axis line O decreases and the lip axial length L increases corresponding to the decrease. Therefore, the second sealing lip 16 presses and moves the gasket body 12 to the one axial side, and further presses and moves the first sealing lip 15 on the axial opposite side to the one axial side (arrow B) through the gasket body 12 by the reaction force generated at this time. Therefore, even when the dimensional tolerance relating to the groove width w of the mounting groove 23 is large and the groove width w is large, the first sealing lip 15 continues to contact the one side surface 23a of the mounting groove 23 without separating, and therefore the sealability by the first sealing lip 15 can be maintained.

Therefore, in the gasket 11 having the sealing lips 15 and 16 in the axial both ends of the gasket body 12 in which the reinforcing ring 14 is embedded, the sealability of the side in which the interference decreases can be maintained even when the gasket body 12 is displaced to the one axial side within the mounting groove 23 when pressure acts on the gasket 11 and, moreover, even when the dimensional tolerance of the groove width w of the mounting groove 23 is large, the sealability can be maintained as described above as intended by the present invention.

In recent years, housings (for example, one housing member 23A) have been partially resinified in order to reduce the weight of the housings. However, creeping sometimes occurs in the resin depending on the atmospheric states, and therefore the gasket 11 is demanded to be able to follow the deformation of the housing by occurrence of the creeping. In this respect, according to the gasket 11 described above, even when the creeping occurs in the resin housing to cause an enlargement of the groove width w of the mounting groove 23, the first sealing lip 15 continues to contact the one side surface 23a of the mounting groove 23 without separating, and therefore the sealability by the first sealing lip 15 can be maintained. Moreover, even when the creeping occurs in the bottom surface 23c of the mounting groove 23, the sealability can be maintained.

In the embodiment described above, the shape of the reinforcing ring 14 is formed to have a substantially L-shaped cross section and more specifically a flange portion 14b is integrally provided radially outward in one end of the cylindrical portion 14a. However, the shape of the reinforcing ring 14 is not particularly limited, and the flange portion 14b may be omitted and the reinforcing ring 14 may contain only the cylindrical portion 14a.

Figure 2:
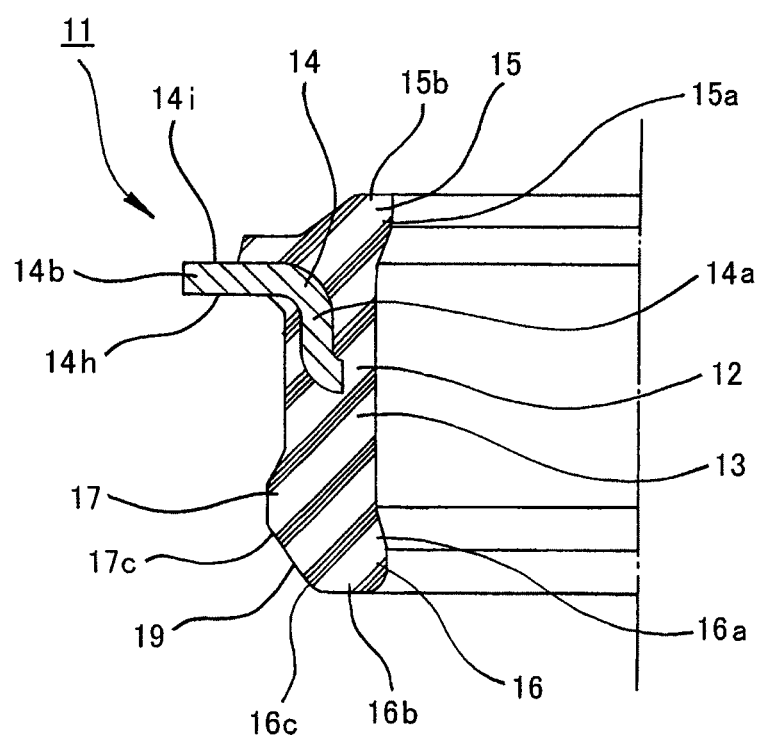
FIG. 2 is a half cross sectional view of a gasket according to another embodiment of the present invention.

Moreover, in the embodiment described above, an end surface of the other axial side (undersurface in FIG. 1) of the flange portion 14b in the reinforcing ring 14 is embedded within the thickness of the gasket body 12 containing a rubber-like elastic body. However, as illustrated in FIG. 2, an end surface 14h of the other axial side of the flange portion 14b may be brought into a state where the end surface 14h of the other axial side is partially or entirely (substantially entirely in FIG. 2) directly exposed.

Moreover, in the embodiment described above, an end surface of the one axial side (upper surface in FIG. 1) of the flange portion 14b in the reinforcing ring 14 is embedded within the thickness of the gasket body 12 containing a rubber-like elastic body. However, as illustrated in FIG. 2, an end surface 14i of the one axial side of the flange portion 14b may be brought into a state where the end surface 14i is partially or entirely (substantially half of the outer diameter side in FIG. 2) directly exposed.

Moreover, the pressure resistance of the first sealing lip 15 can be further improved by adopting the following configurations for the reinforcing ring 14.

Figure 3:
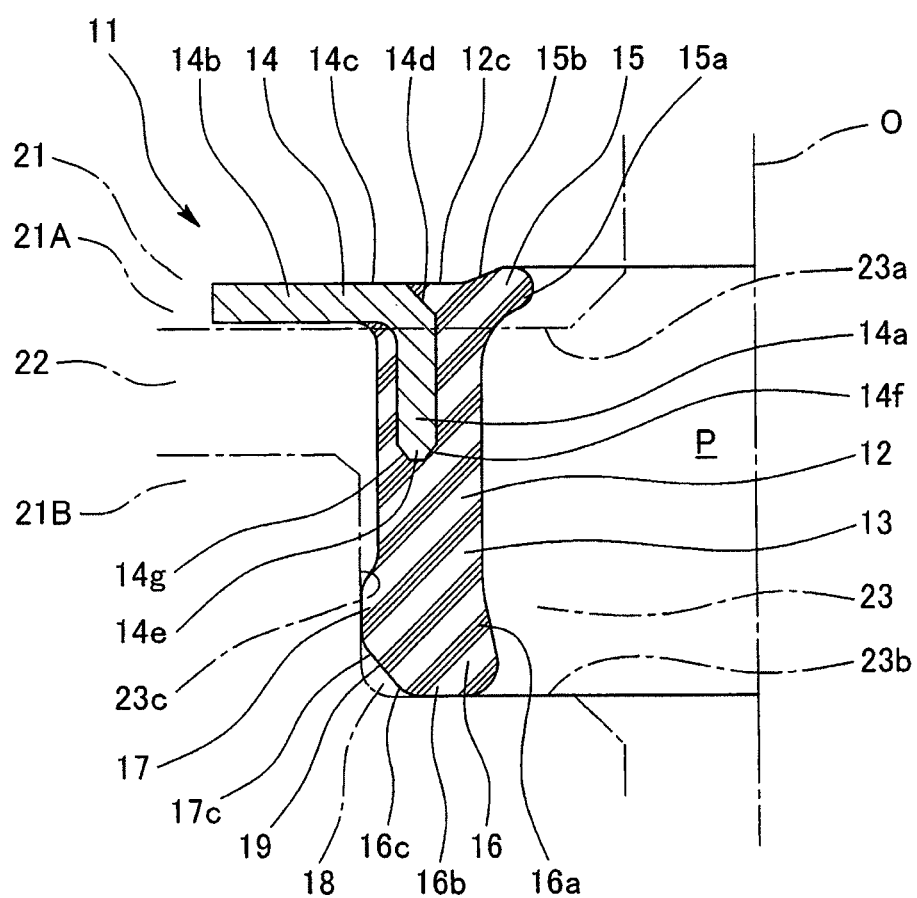
FIG. 3 is a half cross sectional view of a gasket according to another embodiment of the present invention.
Figure 4:
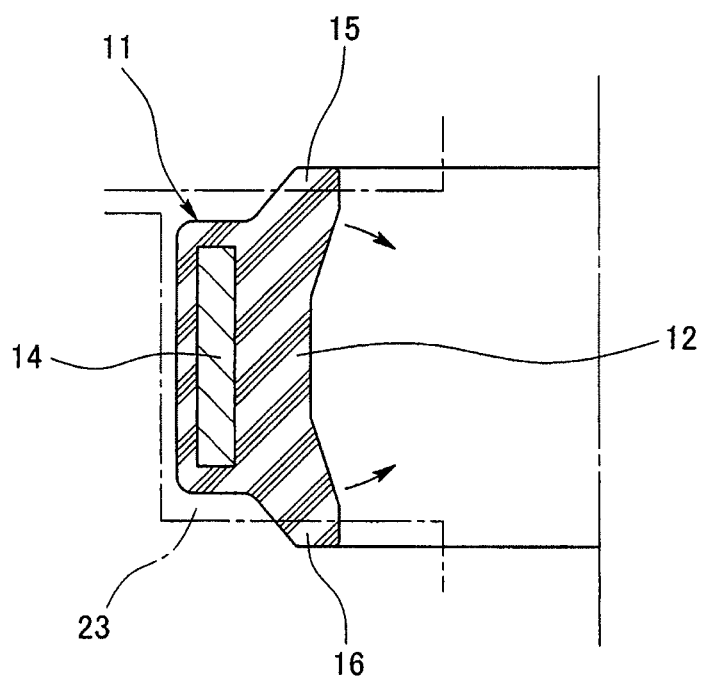
FIG. 4 is a half cross sectional view of a gasket according to a conventional example.
Figure 5:
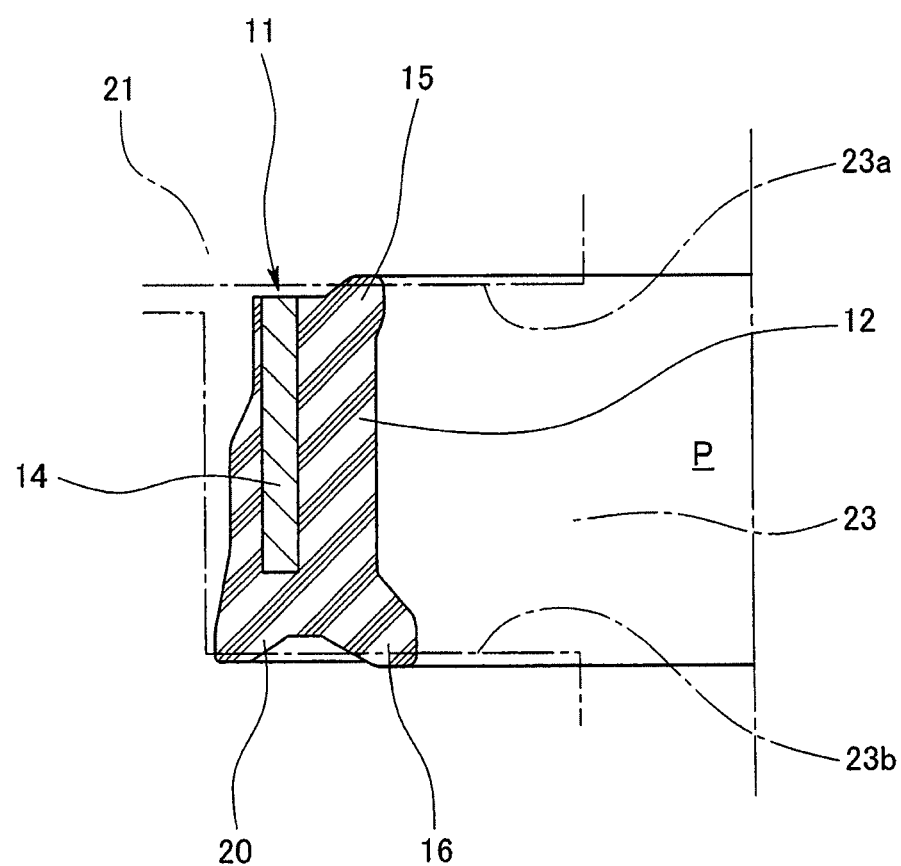
FIG. 5 is a half cross sectional view of a gasket according to a conventional example (prior art).

More specifically, the entire reinforcing ring 14 is embedded within the thickness of the gasket book 12 containing a rubber-like elastic body as illustrated in FIG. 1 in the embodiment described above. Alternatively, the reinforcing ring 14 is embedded in the gasket body 12 in a state where an end surface 14c of the one axial side of the reinforcing ring 14 is exposed to an end surface 12c of the one axial side of the gasket body 12 as illustrated in FIG. 3.

According to this configuration, when pressure acts on the gasket 11 when mounted, so that the gasket body 12 is displaced to the one axial side within the mounting groove 23, the end surface 14c of the one axial side of the reinforcing ring 14 directly contacts the one side surface 23a of the mounting groove 23, which is the end surface of the housing 21A. Therefore, the reinforcing ring 14 serves as the outer wall to suppress the deformation to the outer diameter side of the first sealing lip 15, and therefore the first sealing lip 15 becomes difficult to be deformed. Therefore, the pressure resistance of the first sealing lip 15 can be improved.

Moreover, in the embodiment described above, a corner portion (inner peripheral corner portion) where the inner peripheral surface of the cylindrical portion 14a and the end surface of the one axial side of the flange portion 14b in the reinforcing ring 14 intersect with each other is formed into an R-shape of an arc-shaped cross sectional shape as illustrated in FIG. 1. Alternatively, a corner portion (inner peripheral corner portion) 14d where the inner peripheral surface of the cylindrical portion 14a and the end surface of the one axial side of the flange portion 14b in the reinforcing ring 14 intersect with each other is formed into a tapered shape of a linear cross sectional shape as illustrated in FIG. 3.

According to this configuration, the first sealing lip 15 becomes difficult to be deformed to the outer diameter side, and therefore the pressure resistance of the first sealing lip 15 can be improved as with the embedded structure described above.

Moreover, by adopting the following configuration for the reinforcing ring 14, the thickness dimension in the radial direction of the gasket 11 can be reduced, so that space saving in the radial direction can be realized.

More specifically, in the embodiment described above, the end portion of the other axial side of the cylindrical portion 14a in the reinforcing ring 14 has a bent shape of being bent to the inner diameter side as illustrated in FIG. 1. Alternatively, an end portion 14e of the other axial side of the cylindrical portion 14a in the reinforcing ring 14 is formed into a linear straight shape in the axial direction as illustrated in FIG. 3.

According to this configuration, the inner diameter dimension of the reinforcing ring 14 is enlarged, whereby the thickness dimension in the radial direction of the reinforcing ring 14 is reduced, and therefore the radial direction thickness dimension of the gasket 11 can be reduced, so that space saving in the radial direction can be realized.

When there is a possibility that square tip corner portions of the straight shape may damage the gasket body 12 containing a rubber-like elastic body, chamfered portions 14f and 14g each may be provided in each of the tip corner portions of the end portion 14e.

In the embodiment described above, the gasket 11 seals the pressure P present on the inner peripheral side (inner peripheral sealing) and the mounting groove 23 to which the gasket 11 is mounted is opened radially inward, but the direction of the radial direction may be opposite. More specifically, the present invention is applied also to a case where the gasket 11 seals the pressure P present on the outer peripheral side (outer peripheral seal) and the mounting groove 23 to which the gasket 11 is mounted is opened radially outward.

DESCRIPTION OF REFERENCE NUMERALS 11 gasket
12 gasket body
12c, 14c, 14i end surface of one axial side
13 annular body
14 reinforcing ring
14a cylindrical portion
14b flange portion
14d corner portion
14e end portion of the other axial side
14f, 14g chamfered portion
14h end surface of the other axial side
15 first sealing lip
15a, 16a inner diameter projection portion
15b, 16b end surface projection portion
16 second sealing lip
16c outer peripheral surface
17 seal bead
17c rising surface
18 space portion
19 tapered surface
21 housing
21A, 21B housing member
22 facing portion
23 mounting groove
23a one side surface
23b other side surface
23c bottom surface

What is claimed is:

1. A gasket, which is mounted to a gasket mounting groove which is opened radially inward or radially outward and has a bottom surface and a pair of axial side surfaces to seal pressure, the gasket having a central axis, and the gasket comprising:
   a gasket body in which a reinforcing ring is embedded;
   a first sealing lip which is provided in an end portion of one axial side of the gasket body and extends radially inwardly towards the gasket central axis and is brought into close contact to one side surface of the mounting groove when mounted; and
   a second sealing lip which is provided in an end portion of another axial side of the gasket body and projects radially inwardly towards the gasket central axis and is brought into close contact to another side surface of the mounting groove when mounted,
   the gasket having a structure in which the gasket body is displaced to the one axial side within the mounting groove when pressure acts on the gasket because rigidity of the second sealing lip is set to be higher than rigidity of the first sealing lip or the reinforcing ring is disposed closer to the one axial side within the gasket body,
   wherein a seal bead that projects radially outwardly away from the gasket central axis, and which is brought into close contact to the bottom surface of the mounting groove when mounted is provided in the gasket body,
   a space portion surrounded by the second sealing lip, the seal bead, and the bottom surface and the another side surface of the mounting groove when mounted is provided, and
   the reinforcing ring is integrally provided with a flange portion radially outward in one end of a cylindrical portion.

2. The gasket according to claim 1,
   wherein a rising surface on a side of the bottom surface of the mounting groove of the second sealing lip and a rising surface of the another axial side of the seal bead are continuously formed by a tapered surface of a linear cross sectional shape.

3. The gasket according to claim 2,
   wherein the reinforcing ring is embedded in the gasket body in a state where an end surface of the one axial side of the reinforcing ring is exposed to an end surface of the one axial side of the gasket body, and
   when the gasket body is displaced to the one axial side within the mounting groove, the reinforcing ring abuts on the one side surface of the mounting groove.

4. The gasket according to claim 1,
   wherein the reinforcing ring is embedded in the gasket body in a state where an end surface of the one axial side of the reinforcing ring is exposed to an end surface of the one axial side of the gasket body, and
   when the gasket body is displaced to the one axial side within the mounting groove, the reinforcing ring abuts on the one side surface of the mounting groove.

* * * * *